United States Patent
Cann et al.

(10) Patent No.: US 10,266,618 B2
(45) Date of Patent: Apr. 23, 2019

(54) CHROMIUM-BASED CATALYST COMPOSITIONS FOR OLEFIN POLYMERIZATION

(71) Applicant: Univation Technologies, LLC, Houston, TX (US)

(72) Inventors: Kevin J. Cann, Tierra Verde, FL (US); John H. Moorhouse, Middlesex, NJ (US); Parul A. Khokhani, Bound Brook, NJ (US); Tomas T. Tamargo, Howell, NJ (US); Kevin R. Gross, South Charleston, WV (US); Mark G. Goode, South Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 72 days.

(21) Appl. No.: 15/524,049

(22) PCT Filed: Nov. 23, 2015

(86) PCT No.: PCT/US2015/062110
§ 371 (c)(1),
(2) Date: May 3, 2017

(87) PCT Pub. No.: WO2016/085842
PCT Pub. Date: Jun. 2, 2016

(65) Prior Publication Data
US 2018/0327521 A1  Nov. 15, 2018

Related U.S. Application Data

(60) Provisional application No. 62/083,533, filed on Nov. 24, 2014.

(51) Int. Cl.
| | | |
|---|---|---|
| C08F 4/69 | (2006.01) | |
| C08F 10/02 | (2006.01) | |
| C08F 110/02 | (2006.01) | |
| B01J 23/26 | (2006.01) | |
| C08F 4/02 | (2006.01) | |

(52) U.S. Cl.
CPC ............... *C08F 4/69* (2013.01); *B01J 23/26* (2013.01); *C08F 4/025* (2013.01); *C08F 110/02* (2013.01); *C08F 2410/01* (2013.01); *C08F 2410/02* (2013.01); *C08F 2500/18* (2013.01)

(58) Field of Classification Search
CPC .................................. C08F 4/69; C08F 10/02
See application file for complete search history.

(56) References Cited

U.S. PATENT DOCUMENTS

| | | | |
|---|---|---|---|
| 4,946,914 A | 8/1990 | Hsieh | |
| 5,075,395 A | 12/1991 | Durand et al. | |
| 5,179,178 A | 1/1993 | Stacy et al. | |
| 6,326,443 B1 | 12/2001 | Monoi et al. | |
| 6,646,069 B2 | 11/2003 | Monoi et al. | |
| 6,855,784 B2 * | 2/2005 | Matsunaga | C07F 17/00 502/152 |
| 2004/0167015 A1 | 8/2004 | Cann et al. | |
| 2008/0076951 A1 * | 3/2008 | Jorgensen | C08F 10/00 585/502 |
| 2008/0214385 A1 | 9/2008 | Agapiou et al. | |
| 2011/0010938 A1 | 1/2011 | Moorhouse et al. | |
| 2011/0256632 A1 | 10/2011 | Hussein et al. | |
| 2013/0310245 A1 | 11/2013 | Aliyev et al. | |
| 2015/0274859 A1 * | 10/2015 | Cann | C08F 210/16 526/114 |

FOREIGN PATENT DOCUMENTS

| | | |
|---|---|---|
| CN | 1214344 | 4/1999 |
| JP | 2001294612 | 10/2001 |
| JP | 2002020412 | 1/2002 |
| JP | 2007039603 | 2/2007 |

OTHER PUBLICATIONS

International Search Report & Written Opinion for related PCT Application PCT/US2015/062110, dated May 24, 2016 (17 pgs).
2nd Written Opinion for related PCT Application PCT/US2015/062110, dated Oct. 19, 2016 (7 pgs).
International Preliminary Report on Patentability for related PCT Application PCT/US2015/062110, dated Mar. 3, 2017 (9 pgs).

* cited by examiner

*Primary Examiner* — Caixia Lu
(74) *Attorney, Agent, or Firm* — Brooks, Cameron & Huebsch, PLLC

(57) ABSTRACT

Modified chromium-based catalyst compositions for olefin polymerization are disclosed. The modifiers prevent or reduce catalyst particle aggregation providing improved catalyst particle dispersion and consistent flow index response of the compositions in olefin polymerization.

20 Claims, No Drawings

CHROMIUM-BASED CATALYST COMPOSITIONS FOR OLEFIN POLYMERIZATION

This application is a National Stage Application under 35 U.S.C. § 371 of International Application Number PCT/US2015/062110, filed Nov. 23, 2015 and published as WO 2016/085842 on Jun. 2, 2016, which claims the benefit to U.S. Provisional Application 62/083,533, filed Nov. 24, 2014, the entire contents of which are incorporated herein by reference in its entirety.

FIELD

The present disclosure relates generally to polyolefin manufacture with chromium-based catalysts and, more particularly, to modified chromium-based catalysts having improved properties.

BACKGROUND

Polyolefins have been used extensively in a wide variety of applications inclusive of food packaging, textiles, and resin materials for various molded articles. Different polymer properties may be desired depending on the intended use of the polymer. For example, polyolefins having relatively low molecular weights and narrow molecular weight distributions are suitable for articles molded by an injection molding method. On the other hand, polyolefins having relatively high molecular weights and broad molecular weight distributions are suitable for articles molded by blow molding or inflation molding. For example, in many applications, medium-to-high molecular weight polyethylenes are desirable. Such polyethylenes have sufficient strength for applications which require such strength (e.g., pipe applications), and simultaneously possess good processing characteristics. Similarly, polyolefins having a particular flow index or within a particular flow index range, where the flow index is a measure of the ease of flow of the melt of a thermoplastic polymer, are suitable for various applications.

Ethylene polymers having broad molecular weight distributions can be obtained by use of a chromium-based catalyst obtained by calcining a chromium compound carried on an inorganic oxide carrier in a non-reducing atmosphere to activate it such that, for example, at least a portion of the carried chromium atoms is converted to hexavalent chromium atoms ($Cr^{+6}$). This type of catalyst is commonly referred to in the art as the Phillips catalyst. The chromium compound is impregnated onto silica, dried to a free-flowing solid, and heated in the presence of oxygen to about 400° C.-860° C., converting most or all of the chromium from the +3 to the +6 oxidation state.

Another chromium-based catalyst used for high density polyethylene applications consists of silyl chromate (e.g., bis-triphenylsilyl chromate) chemisorbed on dehydrated silica and subsequently reduced with diethylaluminum ethoxide (DEAlE). The resulting polyethylenes produced by each of these catalysts are different with respect to some important properties. Chromium oxide-on-silica catalysts have good productivity (g PE/g catalyst), also measured by activity (g PE/g catalyst-hr), but often produce polyethylenes with molecular weight distributions narrower than that desired for applications such as large part blow molding, film, and pressure pipe. Silyl chromate-based catalysts produce polyethylenes with desirable molecular weight characteristics (broader molecular weight distribution with a high molecular weight shoulder on molecular weight distribution curve), but often may not have as high productivity or activity as chromium oxide-on-silica catalysts.

Monoi et al., in Japanese Patent Application 2002-020412, disclose the use of inorganic oxide-supported Cr+6-containing solid components (A) prepared by activating under non-reducing conditions, then adding dialkylaluminum functional group-containing alkoxides (B) which contain an Al—O—C—X functional group in which X is either an oxygen or a nitrogen atom, and trialkylaluminum (C) to polymerize ethylene. The resulting ethylene polymers are said to possess good environmental stress crack resistance and good blow molding creep resistance.

Monoi et al., in U.S. Pat. No. 6,326,443, disclose the preparation of a polyethylene polymerization catalyst using a chromium compound, adding an organic aluminum compound more rapidly than specified by a certain mathematical formula, and drying the resulting product at a temperature not higher than 60° C., more rapidly than specified by another mathematical formula. Both formulae are expressed as functions of batch size. Monoi teaches that by minimizing the addition time of the organic aluminum compound and the drying time, a catalyst with high activity and good hydrogen response is obtained.

Monoi et al., in U.S. Pat. No. 6,646,069, disclose a method of ethylene polymerization in co-presence of hydrogen using a trialkylaluminum compound-carried chromium-based catalyst, wherein the chromium-based catalyst is obtained by activating a chromium compound carried on an inorganic oxide carrier by calcination in a non-reducing atmosphere to convert chromium atoms into the +6 state, treating the resulting substance with a trialkylaluminum compound in an inert hydrocarbon solvent, and then removing the solvent.

Hasebe et al., in Japanese Patent Publication 2001-294612, disclose catalysts containing inorganic oxide-supported chromium compounds calcined at 300° C.-1100° C. in a non-reducing atmosphere, $R_{3-n}AlL_n$ (R=C1-C8 alkyl; L=C1-C8 alkoxy or phenoxy; and 0<n<1), and Lewis base organic compounds. The catalysts are said to produce polyolefins with high molecular weight and narrow molecular weight distribution.

Da et al., in Chinese Patent 1214344, teach a supported chromium-based catalyst for gas-phase polymerization of ethylene prepared by impregnating an inorganic oxide support having hydroxyl group on the surface with an inorganic chromium compound aqueous solution. The particles formed are dried in air and activated in an oxygen-containing atmosphere. The activated catalyst intermediate is reduced with an organic aluminum compound.

Durand et al., in U.S. Pat. No. 5,075,395, teach a process for elimination of the induction period in the polymerization of ethylene. The polymerization is conducted with a charge powder in the presence of a catalyst comprising a chromium oxide compound associated with a granular support and activated by thermal treatment, this catalyst being used in the form of a prepolymer. The Durand process is characterized in that the charge powder employed is previously subjected to a treatment by contacting the charge powder with an organoaluminum compound in such a way that the polymerization starts up immediately after the contacting of the ethylene with the charge powder in the presence of the prepolymer.

The above described chromium-based catalysts may be used to produce select grades of polymers. Very often, polymerization reactors are required to produce a broad range of products, having flow indices that may vary from 0.1 dg/min to about 100 dg/min, for example. The flow index response of a chromium-based catalyst refers to the range of the flow index of the polymer made by the catalyst under a given set of polymerization conditions. It would be desirable to provide chromium-based catalyst compositions which may be manufactured reproducibly and which have consistent flow index response.

SUMMARY

There is provided a chromium-based catalyst composition for olefin polymerization comprising:
a) at least one inorganic oxide supported chromium catalyst;
b) a modifier comprising at least one particulate material having an average particle size of less than about 5 micron and/or at least one antistatic agent;
c) one or more reducing agents; and
d) optionally, one or more liquid vehicles.

The inorganic oxide supported chromium catalyst may comprise chromium oxide catalysts and/or silyl chromate catalysts. The inorganic oxide support may have a pore volume of about 0.5 to about 6.0 cm$^3$/g and a surface area of about 50 to about 1000 m$^2$/g. The average particle size of the inorganic oxide supported chromium catalyst may be about 20 to about 300 microns.

The average particle size of the at least one particulate material may be less than 3 microns, or may be less than 2 microns, or may be less than 1 micron, or may be less than 500 nm, or may be less than 250 nm. The average particle size of the particulate material may be from 1 to 1000 nm, or from 1 to 500 nm, or from 1 to 100 nm, or from 1 to 50 nm, or from 5 to 100 nm, or from 5 to 50 nm.

The particulate material may be at least one inorganic oxide. Exemplary particulate materials include silica or alumina. The particulate material may be a fumed or pyrogenic silica.

The particulate material may be subjected to elevated temperature so as to reduce the water content and/or to reduce the concentration of surface chemical functionality.

The particulate material may be treated with a reagent so as to reduce surface chemical functionality. For example where the particulate material is an inorganic oxide it may be treated to reduce the concentration of surface hydroxyl functionality. Surface hydroxyl functionality may be reduced by treatment with a silane or similar species. The treatment with a reagent may occur after treatment at elevated temperature.

The particulate material may be a fumed silica which has been treated with a silane to fully or partially reduce surface hydroxyl functionality.

The particulate material may be hydrophobic.

The particulate material may reduce or eliminate the interaction or aggregation or agglomeration of the particles of inorganic oxide supported chromium catalyst. In the absence of modifier, such interaction or aggregation or agglomeration may be induced by the reducing agent which in turn may result in poor dispersion of the reducing agent within the supported chromium catalyst matrix. This may lead to a viscous slurry containing gel-like structures. This problem may be reduced or eliminated through the addition of modifiers as herein disclosed. The at least one particulate material having an average particle size of less than about 5 micron may improve the dispersion of reducing agent within the supported chromium catalyst and reduce or eliminate gel formation.

The modifier may also be at least one antistatic agent. The at least one antistatic agent may be a particulate material or may be in liquid form. When the antistatic agent is in liquid form it may be as a neat liquid. The antistatic agent may also be dissolved in a suitable solvent.

The at least one antistatic agent may have an average primary particle size of less than 20 micron, or less than 10 micron, or less than 2 microns, or less than 1 micron, or less than 500 nm, or less than 250 nm.

The at least one antistatic agent may be a metal carboxylate salt.

The at least one metal carboxylate salt may be in particulate form or may be partially or fully soluble in a suitable liquid vehicle, such as a non-polar liquid. The at least one metal carboxylate salt may have an average primary particle size of less than 20 micron, or less than 10 micron, or less than 2 microns, or less than 1 micron, or less than 500 nm, or less than 250 nm.

The at least one metal carboxylate salt may be represented by the formula:

$$M(Q)_x(OOCR)_y$$

wherein M is a metal from Group 3 to 16 and the Lanthanide and Actinide series, Q is halogen, hydrogen, a hydroxy or hydroxide, alkyl, alkoxy, aryloxy, siloxy, silane or sulfonate group, R is a hydrocarbyl radical having from 1 to 100 carbon atoms, and x is an integer from 0 to 3 and y is an integer from 1 to 4 and the sum of x and y is equal to the valence of the metal.

The at least one metal carboxylate salt may be represented by the formula:

$$(R_1CO_2)_2AlOH$$

wherein R$_1$ is a hydrocarbyl radical containing from 12 to 30 carbon atoms.

The at least one metal carboxylate salt may comprise an aluminum carboxylate.

The metal carboxylate salt may comprise an aluminum mono-stearate, an aluminum di-stearate, an aluminum tri-stearate, or a combination thereof.

The antistatic agent may reduce or eliminate the interaction or aggregation or agglomeration of the particles of inorganic oxide supported chromium catalyst. In the absence of modifier, such interaction or aggregation or agglomeration may be induced by the reducing agent which in turn may result in poor dispersion of the reducing agent within the supported chromium catalyst matrix. This may lead to a viscous slurry containing gel-like structures. This problem may be reduced or eliminated through the addition of modifiers as herein disclosed. The antistatic agent may improve the dispersion of reducing agent within the supported chromium catalyst and reduce or eliminate gel formation.

The reducing agent may comprise one or more organo-aluminum compound. The reducing agent may comprise an alkyl aluminum alkoxide, for example diethylaluminum ethoxide (DEAlE).

The catalyst composition may be in the form of a substantially dry powder or may be in the form of a slurry in a liquid vehicle. Suitable liquid vehicles include non-polar liquids such as hydrocarbons.

The amount of particulate material relative to inorganic oxide supported chromium catalyst in the catalyst composition may be between 0.01% by weight and 10% by weight, or between 0.1% by weight and 5% by weight or between 0.2% by weight and 3% by weight based on the total dry weight of the catalyst composition.

The amount of at least one antistatic agent relative to inorganic oxide supported chromium catalyst in the catalyst composition may be between 0.01% by weight and 10% by weight, or between 0.01% by weight and 5% by weight or between 0.01% by weight and 3% by weight or between 0.01% by weight and 1% by weight based on the total dry weight of the catalyst composition.

There is also provided a chromium-based catalyst composition for olefin polymerization as hereinbefore disclosed wherein the catalyst composition is substantially free of gels. The catalyst composition may be substantially free of particle aggregation.

The chromium-based catalyst composition may comprise any combination of the aforementioned features.

There is also provided a reduced chromium-based catalyst composition for olefin polymerization comprising:
  (a) at least one reduced inorganic oxide supported chromium catalyst as hereinbefore disclosed;
  (b) a modifier, as hereinbefore disclosed, comprising at least one particulate material having an average particle size of less than about 5 micron and/or at least one antistatic agent; and
  (c) optionally, one or more liquid vehicles.

The particulate material and/or antistatic agent may reduce or eliminate the interaction or aggregation or agglomeration of particles of reduced inorganic supported chromium catalyst.

An advantage of the herein disclosed catalyst compositions and reduced catalyst compositions is that inter-particle interactions between the particles of inorganic oxide supported chromium catalyst are minimized. This prevents or substantially minimizes supported catalyst particle aggregation or agglomeration which may occur during the slurry preparation of catalyst compositions comprising inorganic oxide supported chromium catalysts and reducing agents and/or when the reduced catalyst compositions are slurried in suitable liquid vehicles. This, in turn, may lead to improved homogeneity of catalyst batches, particularly on larger scale where mixing during manufacture may be less effective. This may lead to improved catalyst batch to batch consistency. A further advantage of the herein disclosed compositions is that improved catalyst consistency may result in reduced variation in flow index response.

Without wishing to be bound by theory it is postulated that the particulate material having an average particle size of less than about 5 micron and/or the antistatic agent prevents or substantially minimizes supported chromium catalyst particle interaction or aggregation or agglomeration.

This is surprising since particle aggregation or agglomeration in slurry catalyst systems would not be expected to be a problem since static charge should be substantially dissipated.

A further advantage of the herein disclosed catalyst compositions is that the bulk density of the catalyst compositions may be increased relative to catalyst compositions prepared from inorganic oxide supported chromium catalysts and a reducing agent in the absence of a modifier, as hereinbefore disclosed, comprising a particulate material having an average particle size of less than about 5 micron and/or an antistatic agent. This may facilitate the preparation of larger catalysts batches using existing equipment or the transport of larger catalyst volumes using existing transport containers.

Further, the bulk density of an inorganic oxide supported chromium catalyst in the absence of reducing agent may also be increased through treatment with a modifier, as hereinbefore disclosed, comprising a particulate material having an average particle size of less than about 5 micron and/or an antistatic agent.

Further, the bulk density of an inorganic oxide support, particularly a dehydrated inorganic oxide support, may also be increased through treatment with a modifier, as hereinbefore disclosed, comprising a particulate material having an average particle size of less than about 5 micron and/or an antistatic agent.

Further, the bulk density of a reduced inorganic oxide supported chromium catalyst may also be increased through treatment with a modifier, as hereinbefore disclosed, comprising a particulate material having an average particle size of less than about 5 micron and/or an antistatic agent.

It has been discovered that the modifiers, as disclosed herein, may be advantageously employed at various stages of catalyst preparation so as to increase the bulk density of the solid phase.

There is also provided a method of manufacturing a chromium-based catalyst composition for olefin polymerization comprising combining one or more inorganic oxide supported chromium catalysts with at least one particulate material having an average particle size of less than about 5 micron and/or one or more antistatic agents with one or more reducing agents.

The method may comprise the steps of a) combining one or more inorganic oxide supported chromium catalysts with at least one particulate material having an average particle size of less than about 5 micron and/or one or more antistatic agents in a liquid vehicle and b) adding one or more reducing agents.

The method may also comprise the steps of a) combining one or more inorganic oxide supported chromium catalysts with one or more reducing agents in a liquid vehicle and b) adding at least one particulate material having an average particle size of less than about 5 micron and/or one or more antistatic agents.

The above methods may also be performed by adding the reducing agent through an insert tube which is directed to the surface of a slurry of inorganic oxide supported chromium catalyst in a liquid vehicle and away from the walls of the vessel within which the catalyst is manufactured.

The methods may also comprise the step of removing the liquid vehicle so as to provide a substantially dry catalyst composition. The catalyst composition may be in the form of a free flowing powder.

There is also provided a method of polymerizing olefins comprising contacting a catalyst composition according to any one of the hereinbefore disclosed embodiments with one or more olefins under polymerization conditions.

There is also provided a composition comprising:
  a) a thermally treated particulate material;
  b) a hydrophobic particulate material; and
  c) optionally one or more liquid vehicles.

The thermally treated particulate material may comprise an inorganic oxide such as silica or alumina.

The thermally treated particulate material may be treated at a temperature from about 150° C. to about 1000° C.

The hydrophobic particulate material may be a treated, particularly a chemically treated, fumed or pyrogenic silica.

Such compositions are advantageous as it has been discovered that the bulk density of the thermally treated particulate material may be increased through the addition of the hydrophobic particulate material. Small amounts, for example 0.05 to 5%, or 0.1 to 3%, of hydrophobic particulate material by weight relative to the total weight of the particulate material are effective in increasing bulk density by up to 20% or more.

There is also provided a method of increasing the bulk density of a thermally treated particulate material comprising combining the thermally treated particulate material with a hydrophobic particulate material optionally in the presence of one or more liquid vehicles.

DETAILED DESCRIPTION

Before the present compounds, components, compositions, and/or methods are disclosed and described, it is to be understood that unless otherwise indicated this disclosure is not limited to specific compounds, components, compositions, reactants, reaction conditions, ligands, catalyst structures, or the like, as such may vary, unless otherwise specified. It is also to be understood that the terminology used herein is for the purpose of describing particular embodiments only and is not intended to be limiting.

As discussed below, embodiments of the present disclosure include chromium-based catalyst compositions and reduced chromium-based catalyst compositions that have substantially minimized particle agglomeration through addition of a modifier comprising at least one particulate material having an average particle size of less than about 5 micron and/or at least one antistatic agent.

Advantageously, by adding the modifiers as disclosed herein to a chromium-based catalyst or reduced chromium-based catalyst the resulting catalyst compositions may have enhanced homogeneity, improved batch to batch consistency and reduced flow index variation in olefin polymerization. The enhanced homogeneity may be the result of enhanced dispersion of the reducing agent throughout the matrix of particles of supported chromium catalyst.

Embodiments of the disclosure may be directed to controlling particle aggregation or agglomeration in chromium-based catalysts or reduced chromium-based catalysts through the addition of a modifier.

Generally, embodiments disclosed herein relate to reducing the variation in flow index response of supported chromium-based catalysts. In the production of the chromium-based catalyst, the catalyst may be contacted with a reducing agent and at least one particulate material having an average particle size of less than about 5 micron and/or at least one antistatic agent to give a reduced chromium-based catalyst. These reduced chromium-based catalysts may then be employed to polymerize olefins into polyolefins.

As used herein, "flow index response" means that under a certain set of polymerization reaction conditions, the catalyst produces a polymer within a certain molecular weight range.

In the subsequent polymerization with the catalyst compositions as disclosed herein, the molar ratio of reducing agent/Cr in the catalyst composition or the weight percent (wt %) reducing agent in the catalyst composition, polymerization temperature, residence time of the catalyst composition in the polymerization reactor, trace oxygen addback concentration introduced to or present in the reactor, and comonomer and hydrogen ratios to ethylene may each affect the molecular weight of the polymer made with the catalyst composition. When the catalyst composition is prepared consistently, and the subsequent polymerization process variables are held constant or generally constant, a catalyst composition of a certain formulation should make the same polymer. Even with minor variations in the preparation and process variables, such as within a given control tolerance, a similar polymer should be formed. Thus, control of the flow index response of a catalyst composition in the production of the catalyst composition may be implemented to give a certain molecular weight range for the polymer in the downstream polymerization according to embodiments disclosed herein.

Polymer flow index is inversely related to polymer molecular weight. The flow index response may be modified herein using terms such as "high," "medium," or "low" to indicate the relative range of the flow index of the resulting polymer made under a given set of polymerization conditions as compared to similar chromium-based catalyst compositions produced in the absence of the herein disclosed modifiers. For example, for a given chromium-based catalyst composition produced in the presence or absence of at least one particulate material having an average particle size of less than about 5 micron and/or at least one antistatic agent one catalyst composition may have a low flow index response, producing a higher molecular weight polymer, while the other may have a high flow index response, producing a lower molecular weight polymer.

Polymer melt index is another indicator of polymer molecular weight. Melt index is a measure of the polymer fluidity and is also inversely related to molecular weight. A higher melt index can indicate a higher termination of active polymer chains relative to propagation, and, thus, a lower molecular weight.

For a selected or specified reducing agent/Cr ratio, the consistency of the flow index response of a chromium-based catalyst composition may be affected by the addition of the reducing agent, including the feed rate and the time period over which the reducing agent is added. For example, the flow index response generally increases with a slower rate of addition of the reducing agent. Also, the flow index response generally increases with a faster rate of agitation during addition and reaction of the reducing agent, or a combination of slower rate of addition and faster rate of agitation. The herein disclosed modifiers may eliminate or ameliorate the influence of process variables such as reducing agent addition rate or agitation rate during addition of the reducing agent.

Chromium-Based Catalysts

Although embodiments disclosed herein include chromium oxide and silyl chromate catalysts, the scope of the disclosure should not be limited thereby. One of skill in the art would appreciate that other chromium-based catalysts may be advantageously employed.

Catalysts useful in embodiments disclosed herein include chromium-based catalysts, such as chromium oxide and silyl chromate-based catalysts. The catalyst system chosen for the polymerization often dictates polymer properties such as molecular weight, molecular weight distribution, and flow index.

Chromium oxide-based catalysts, for example, Phillips-type catalysts, may be formed by impregnating a $Cr^{+3}$ species into a porous silica support, followed by calcination of the supported chromium species under oxidizing conditions at about 300° C. to 900° C., or at about 400° C. to 860° C. Under these conditions, at least some of the $Cr^{+3}$ is converted to $Cr^{+6}$. The Phillips catalyst is also commonly referred to in the prior art as inorganic oxide-supported $Cr^{+6}$.

Silyl chromate catalysts are another type of inorganic oxide-supported $Cr^{+6}$ catalysts which tend to produce polyethylenes with improved properties for a number of applications. The silyl chromate catalyst may be formed by dehydrating silica at about 400° C. to 850° C. in air or nitrogen, followed by contacting for specified time a silyl chromate compound, such as bis(triphenylsilyl) chromate, with the silica slurried in inert hydrocarbon solvent, then contacting with an alkyl aluminum alkoxide, such as diethylaluminum ethoxide (DEAlE), for example, and then drying the resulting catalyst product to remove the solvent therefrom.

Cann et al., in U.S. Publication No 2005/0272886, teaches the use of aluminum alkyl activators and co-catalysts to improve the performance of chromium-based catalysts. The addition of aluminum alkyls allow for variable control of side branching, and desirable productivities, and these compounds may be applied to the catalyst directly or added separately to the reactor. Adding the aluminum alkyl compound directly to the polymerization reactor (in-situ) eliminates induction times.

As described herein, flow index is typically an important parameter for polyolefins applications. The flow index is a measure of the ease of flow of the melt of a thermoplastic polymer. Flow index, or I21, as used herein is defined as the weight of polymer in grams flowing in 10 minutes through a capillary of specific diameter and length by a pressure applied via a 21.6 kg load at 190° C. and is usually measured according to ASTM D-1238. The indexes I2 and I5 are similarly defined, where the pressure applied is by a load of 2.16 kg or 5 kg, respectively. I2 and I5 are also referred to as melt indexes.

The flow index is therefore a measure of the ability of a fluid to flow under pressure and temperature. Flow index is an indirect measure of molecular weight, with high flow index corresponding to low molecular weight. At the same time, flow index is inversely proportional to the viscosity of the melt at the conditions of the test, and ratios between a flow index value and a melt index value such as the ratio of I21 to I2 for one material, are often used as a measure for the broadness of a molecular weight distribution.

Flow index is, thus, a very important parameter for polyolefins. Different flow indices may be desirable for different applications. For applications such as lubricants, injection molding, and thin films, a higher flow index polyolefin may be desired, while for applications such as pipe, large drums, pails or automobile gasoline tanks, a lower flow index polyolefin may be desired. Polyolefins for a given application should therefore have a flow index sufficiently high to easily form the polymer in the molten state into the article intended, but also sufficiently low so that the mechanical strength of the final article will be adequate for its intended use.

Reactor process variables may be adjusted to obtain the desired polymer flow index and melt index when using prior art chromium-based catalysts. For example, increasing the temperature of polymerization is known to enhance the rate of termination, but have a comparatively minor effect on the rate of propagation, as reported in M. P. McDaniel, Advances in Catalysis, Vol. 33 (1985), pp 47-98. This may result in more short chain polymers and an increase in melt index and flow index. Catalysts having a low flow index response therefore often require higher reactor temperatures, higher oxygen add-back, and higher hydrogen concentrations to produce a polymer of a given flow index.

However, there are limits on the range over which reactor process variables may be adjusted, such as, for example, reactor temperature, hydrogen and oxygen levels, without adversely affecting the polymerization process or the catalyst productivity. For example, excessively high reactor temperatures may approach the softening or melting point of the formed polymer. This may then result in polymer agglomeration and reactor fouling. Alternatively, low reactor temperatures may lead to a smaller temperature differential with respect to the cooling water, less efficient heat removal, and ultimately lowered production capacity. Further, high oxygen add-back concentrations may lead to reduced catalyst productivity, smaller average polymer particle size, and higher fines which may contribute to reactor fouling. Additionally, variations in hydrogen concentrations may impact polymer properties such as, for example, die swell which may in turn affect the suitability of a polymer for its desired application. Accordingly, adjusting reactor variables to approach operational limits may result in operational problems which may lead to premature reactor shutdown and downtime due to extensive clean-up procedures, as well as undesired gels and other undesired properties of the resulting polymer product.

The ability to reduce the variation in catalyst flow index response by modifying the catalyst composition may therefore avoid operational difficulties, reactor shutdowns, and less economical polymerization conditions. This ability to reduce the variation in catalyst flow index response may facilitate production of catalysts that give polymers with the desired properties to be more easily made. Indeed, embodiments of the techniques described herein related to improving the dispersion of the reducing agent and catalyst composition may improve the consistency of the catalyst composition.

The chromium-based catalyst compositions disclosed herein may include chromium-based catalysts, modifiers and reducing agents. The chromium-based catalysts may include chromium oxide catalysts, silyl chromate catalysts, or a combination of both chromium oxide and silyl chromate catalysts.

The chromium compounds used to prepare chromium oxide catalysts may include $CrO_3$ or any compound convertible to $CrO_3$ under the activation conditions employed. Many compounds convertible to $CrO_3$ are disclosed in U.S. Pat. Nos. 2,825,721, 3,023,203, 3,622,251, and 4,011,382 and include chromic acetyl acetonate, chromic halide, chromic nitrate, chromic acetate, chromic sulfate, ammonium chromate, ammonium dichromate, or other soluble, chromium containing salts. Chromic acetate may be used.

The silyl chromate compounds used to prepare the silyl chromate catalysts disclosed herein may include bis-triethylsilyl chromate, bis-tributylsilyl chromate, bis-triisopentylsilyl chromate, bis-tri-2-ethylhexylsilyl chromate, bis-tridecylsilyl chromate, bis-tri(tetradecyl)silyl chromate, bis-tribenzylsilyl chromate, bis-triphenylethylsilyl chromate, bis-triphenylsilyl chromate, bis-tritolylsilyl chromate, bis-trixylylsilyl chromate, bis-trinaphthylsilyl chromate, bis-triethylphenylsilyl chromate, bis-trimethylnaphthylsilyl chromate, polydiphenylsilyl chromate, and polydiethylsilyl chromate. Examples of such catalysts are disclosed, for example, in U.S. Pat. Nos. 3,324,101, 3,704,287, and 4,100,105, among others. Bis-triphenylsilyl chromate, bis-tritolylsilyl chromate, bis-trixylylsilyl chromate and bis-trinaphthylsilyl chromate may be used to form the silyl chromate catalysts. Bis-triphenylsilyl chromate may be used to form the silyl chromate catalysts.

The silyl chromate compounds may be deposited onto conventional catalyst supports or bases, for example, inorganic oxide materials. The chromium compound used to produce a chromium oxide catalyst may be deposited onto conventional catalyst supports. The term "support," as used herein, refers to any support material, for example a porous support material, including inorganic or organic support materials. Exemplary carriers may be inorganic oxides that include Group 2, 3, 4, 5, 13 and 14 oxides, and more particularly, inorganic oxides of Group 13 and 14 atoms. The Group element notation in this specification is as defined in the Periodic Table of Elements according to the IUPAC 1988 notation (IUPAC Nomenclature of Inorganic Chemistry 1960, Blackwell Publ., London). Therein, Groups 4, 5, 8, 9 and 15 correspond respectively to Groups IVB, VB, IIIA, IVA and VA of the Deming notation (Chemical Rubber Company's Handbook of Chemistry & Physics, 48th edition) and to Groups IVA, VA, IIIB, IVB and VB of the IUPAC 1970 notation (Kirk-Othmer Encyclopedia of Chemical Technology, 2nd edition, Vol. 8, p. 94). Non-limiting examples of support materials include inorganic oxides such as silica, alumina, titania, zirconia, thoria, as well as mixtures of such oxides such as, for example, silica-chromium, silica-alumina, silica-titania, and the like.

The inorganic oxide materials which may be used as a support in the catalyst compositions of the present disclosure may be porous materials having variable surface area and particle size. The support may have a surface area in the range of 50 to 1000 square meters per gram, and an average particle size of 20 to 300 micrometers. The support may have a pore volume of about 0.5 to about 6.0 $cm^3/g$ and a surface area of about 200 to about 600 $m^2/g$. The support may have a pore volume of about 1.1 to about 1.8 $cm^3/g$ and a surface area of about 245 to about 375 $m^2/g$. The support may have a pore volume of about 2.4 to about 3.7 $cm^3/g$ and a surface area of about 410 to about 620 $m^2/g$. The support may have a pore volume of about 0.9 to about 1.4 $cm^3/g$ and a surface area of about 390 to about 590 $m^2/g$. Each of the above properties may be measured using conventional techniques as known in the art.

The support materials may comprise silica, particularly amorphous silica, and most particularly high surface area amorphous silica. Such support materials are commercially available from a number of sources. Such sources include the W.R. Grace and Company which markets silica support materials under the trade names of Sylopol 952 or Sylopol 955, and PQ Corporation, which markets silica support materials under various trade designations, including ES70. The silica is in the form of spherical particles, which are obtained by a spray-drying process. Alternatively, PQ Corporation markets silica support materials under trade names such as MS3050 which are not spray-dried. As procured, all of these silicas are not calcined (i.e., not dehydrated). However, silica that is calcined prior to purchase may be used in the catalyst compositions of the present disclosure.

Supported chromium compounds, such as chromium acetate, which are commercially available, may also be used. Commercial sources include the W.R. Grace and Company which markets chromium on silica support materials under trade names such as Sylopol 957, Sylopol 957HS, or Sylopol 957BG, and PQ Corporation, which markets chromium on silica support materials under various trade names, such as ES370. The chromium on silica support is in the form of spherical particles, which are obtained by a spray-drying process. Alternatively, PQ Corporation markets chromium on silica support materials under trade names such as C35100MS and C35300MS which are not spray-dried. As procured, all of these silicas are not activated. However, if available, chromium supported on silica that is activated prior to purchase may be used in catalysts of the present disclosure.

Activation of the supported chromium oxide catalyst can be accomplished at nearly any temperature from about 300° C. up to the temperature at which substantial sintering of the support takes place. For example, activated catalysts may be prepared in a fluidized-bed. The passage of a stream of dry air or oxygen through the supported chromium-based catalyst during the activation aids in the displacement of any water from the support and converts, at least partially, chromium species to Cr+6.

Temperatures used to activate the chromium-based catalysts are often high enough to allow rearrangement of the chromium compound on the support material. Peak activation temperatures of from about 300° C. to about 900° C. for periods of from greater than 1 hour to as high as 48 hours are acceptable. The supported chromium oxide catalysts may be activated at temperatures from about 400° C. to about 850° C., from about 500° C. to about 700° C., and from about 550° C. to about 650° C. Exemplary activation temperatures are about 600° C., about 700° C., and about 800° C. Selection of an activation temperature may take into account the temperature constraints of the activation equipment. The supported chromium oxide catalysts may be activated at a chosen peak activation temperature for a period of from about 1 to about 36 hours, or from about 3 to about 24 hours, or from about 4 to about 6 hours. Exemplary peak activation times may be about 4 hours or about 6 hours. Activation may be carried out in an oxidative environment; for example, well dried air or oxygen is used and the temperature is maintained below the temperature at which substantial sintering of the support occurs. After the chromium compounds are activated, a powdery, free-flowing particulate chromium oxide catalyst is produced.

As organometallic components used in the preparation of the catalysts and catalyst compositions of the present disclosure may react with water, the support material may be substantially dry. For example, where the chromium-based catalysts are silyl chromates, the untreated supports may be dehydrated or calcined prior to contacting with the chromium-based catalysts.

The support may be calcined at elevated temperatures to remove water, or to effect a chemical change on the surface of the support. Calcination of the support material may be performed using any procedure known to those of ordinary skill in the art, and the present disclosure is not limited by the calcination method. One such method of calcination is disclosed by T. E. Nowlin et al., "Ziegler-Natta Catalysts on Silica for Ethylene Polymerization," J. Polym. Sci., Part A: Polymer Chemistry, vol. 29, 1167-1173 (1991).

For example, calcined silica may be prepared in a fluidized-bed, as follows. A silica support material (e.g. Sylopol 955), is heated in steps or steadily from ambient temperature to the desired calcining temperature (e.g., 600° C.) while passing dry nitrogen or dry air through or over the support material. The silica is maintained at about this temperature for about 1 to about 4 hours, after which it is allowed to cool to ambient temperature. The calcination temperature primarily affects the number of OH groups on the support surface; i.e., the number of OH groups on the support surface (silanol groups in the case of silica) is approximately inversely proportional to the temperature of drying or dehydration: the higher the temperature, the lower the hydroxyl group content.

Support materials may be calcined at a peak temperature from about 350° C. to about 850° C., or from about 400° C. to about 700° C. or from about 500° C. to about 650° C. Exemplary calcination temperatures are about 400° C., about 600° C., and about 800° C. Calcination times are from about 2 hours to about 24 hours, or from about 4 hours to about 16 hours, or from about 8 hours to about 12 hours. Exemplary times at peak calcination temperatures are about 1 hour, about 2 hours, or about 4 hours.

The silyl chromate compound may be contacted with the calcined support to form a "bound catalyst." The silyl chromate compound may then be contacted with the calcined support material in any of the ways known to one of ordinary skill in the art. The silyl chromate compound may be contacted with the support by any suitable means, such as in a solution, slurry, or solid form, or some combination thereof, and may be heated to any desirable temperature, for a specified time sufficient to effectuate a desirable chemical/physical transformation.

This contacting and transformation are usually conducted in a non-polar solvent. Suitable non-polar solvents may be materials which are liquid at contacting and transformation temperatures and in which some of the components used during the catalyst preparation, i.e., silyl chromate compounds and reducing agents are at least partially soluble. The non-polar solvents may be alkanes, particularly those containing about 5 to about 10 carbon atoms, such as pentane, isopentane, hexane, isohexane, n-heptane, isoheptane, octane, nonane, and decane. Cycloalkanes, particularly those containing about 5 to about 10 carbon atoms, such as cyclohexane and methylcyclohexane, may also be used. The non-polar solvent may be a solvent mixture. Exemplary non-polar solvents are isopentane, isohexane, and hexane. Isopentane may be used due to its low boiling point which makes its removal convenient and fast. The non-polar solvent may be purified prior to use, such as by degassing under vacuum and/or heat or by percolation through silica gel and/or molecular sieves, to remove traces of water, molecular oxygen, polar compounds, and other materials capable of adversely affecting catalyst activity.

The mixture may be mixed for a time sufficient to support or react the silyl chromate compound on the silica support. The reducing agent and modifiers may then be contacted with this slurry. Alternatively, after supporting the silyl chromate compound on the support, and before adding the reducing agent and modifiers, the solvent may then be substantially removed by evaporation, to yield a free-flowing supported silyl chromate on support. The thus supported silyl chromate may be re-slurried in the same or a different non-polar solvent and contacted with a reducing agent and modifiers.

Once the catalyst is supported, and in the case of chromium oxide catalysts, activated, the chromium-based catalyst composition may then be slurried in a non-polar solvent, prior to the addition of the reducing agent and modifiers. The supported catalyst may be chromium oxide supported catalysts, silyl chromate catalysts, or a mixture of both. This slurry is prepared by admixture of the supported catalyst with the non-polar solvent. In some embodiments, the supported silyl chromate compound is not dried before the addition of the reducing agent and modifiers, but instead is left slurried in the non-polar solvent for reasons such as reduced costs.

The chromium-based catalyst may comprise an inorganic oxide support having a pore volume of about 1.1 to about 1.8 $cm^3/g$ and a surface area of about 245 to about 375 $m^2/g$.

The chromium-based catalyst may comprise an inorganic oxide support having a pore volume of about 2.4 to about 3.7 $cm^3/g$ and a surface area of about 410 to about 620 $m^2/g$.

The chromium-based catalyst may comprise an inorganic oxide support having a pore volume of about 0.9 to about 1.4 $cm^3/g$ and a surface area of about 390 to about 590 $m^2/g$.

The chromium-based catalyst may comprise an inorganic support comprising a surface area of 50 to 1000 square meters per gram and an average particle size of 20 to 300 micrometers.

Catalyst Modifiers

The chromium-based catalyst compositions or reduced chromium-based catalyst compositions disclosed herein comprise a modifier comprising at least one particulate material having an average particle size of less than about 5 micron and/or at least one antistatic agent. Whatever modifier is employed it should not substantially interfere with the reduction of the inorganic oxide supported chromium catalyst.

Particulate Material

In catalyst compositions comprising one or more particulate materials the particulate material may have an average particle size of less than about 5 micron. The average particle size of the particulate material may be less than 3 microns, or may be less than 2 microns, or may be less than 1 micron, or may be less than 500 nm, or may be less than 250 nm. The average particle size of the particulate material may be from 1 to 1000 nm, or from 1 to 500 nm, or from 1 to 100 nm, or from 1 to 50 nm, or from 5 to 100 nm, or from 5 to 50 nm. The average particle size of the particulate material may be at least an order of magnitude smaller than the average particle size of the inorganic oxide supported chromium catalyst. The average particle size of the particulate material may be at least two orders of magnitude smaller than the average particle size of the inorganic oxide supported chromium catalyst.

The particulate material may be at least one inorganic oxide. Exemplary particulate materials include silica or alumina. The particulate material may be a fumed or pyrogenic silica.

The particulate material may be subjected to elevated temperature so as to reduce the water content and/or to reduce the concentration of surface chemical functionality.

The particulate material may be heated at a peak temperature from about 150° C. to about 850° C., or from about 200° C. to about 700° C. or from about 300° C. to about 650° C. Exemplary temperatures are about 400° C., about 600° C., and about 800° C.

The particulate material may be treated with a reagent so as to reduce surface chemical functionality. For example where the particulate material is an inorganic oxide it may be treated to reduce the concentration of surface hydroxyl functionality. Surface hydroxyl functionality may be reduced by treatment with a silane or similar species. The treatment with a reagent may occur after treatment at elevated temperature.

The particulate material may be a fumed silica which has been treated with a silane to fully or partially reduce surface hydroxyl functionality.

The particulate material may be hydrophobic.

The particulate material may reduce or eliminate the interaction or agglomeration of the particles of inorganic oxide supported chromium catalyst.

Exemplary inorganic oxides include fumed or pyrogenic silicas. The average particle size of the fumed silica may be 1 to 200 nm, or 2 to 100 nm or 5-50 nm. The fumed silica may be substantially non-porous. The fumed silica may have a surface area of 20-600 $m^2/g$. The fumed silica may have a bulk density of 0.03-0.2 $g/cm^3$. The fumed silica may be a hydrophobic fumed silica. The fumed silica may be treated with a silane or siloxane.

An exemplary particulate material is Cabosil® TS-610 which is a fumed silica of average particle size 5 to 50 nm which has been treated with dimethyldichorosilane. It is produced by Cabot Corporation.

Other particulate materials which may be useful as modifiers include silicas such as Ultrasil® (Evonik), Hubersil® (Huber), HISIL223 and SILENE732D (PPG Industries).

The amount of particulate material relative to inorganic oxide supported chromium catalyst in the catalyst composition may be between 0.01% by weight and 10% by weight, or between 0.1% by weight and 5% by weight or between 0.2% by weight and 3% by weight based on the total weight of the catalyst composition.

Antistatic Agents

In catalyst compositions comprising one or more antistatic agents the antistatic agents may be in particulate or soluble form. The at least one antistatic agent may be a metal carboxylate salt.

The at least one antistatic agent may be in particulate form or may be soluble in a suitable liquid vehicle, such as a non-polar liquid. The at least one antistatic agent may have an average primary particle size of less than 20 micron, or less than 10 micron, or less than 2 microns, or less than 1 micron, or less than 500 nm, or less than 250 nm.

The at least one metal carboxylate salt may be represented by the formula:

$$M(Q)_x(OOCR)_y$$

wherein M is a metal from Group 3 to 16 and the Lanthanide and Actinide series, Q is halogen, hydrogen, a hydroxy or hydroxide, alkyl, alkoxy, aryloxy, siloxy, silane or sulfonate group, R is a hydrocarbyl radical having from 1 to 100 carbon atoms, and x is an integer from 0 to 3 and y is an integer from 1 to 4 and the sum of x and y is equal to the valence of the metal.

Non-limiting examples include saturated, unsaturated, aliphatic, aromatic or saturated cyclic carboxylic acid salts where the carboxylate ligand has preferably from 2 to 24 carbon atoms, such as acetate, propionate, butyrate, valerate, pivalate, caproate, isobuytlacetate, t-butyl-acetate, caprylate, heptanate, pelargonate, undecanoate, oleate, octoate, palmitate, myristate, margarate, stearate, arachate and tercosanoate.

Non-limiting examples of the metal portion includes a metal from the Periodic Table of Elements selected from the group of Al, Mg, Ca, Sr, Sn, Ti, V, Ba, Zn, Cd, Hg, Mn, Fe, Co, Ni, Pd, Li and Na.

The at least one metal carboxylate salt may be represented by the formula:

$$(R_1CO_2)_2AlOH$$

wherein $R_1$ is a hydrocarbyl radical containing from 12 to 30 carbon atoms.

The at least one metal carboxylate salt may comprises an aluminum carboxylate.

The metal carboxylate salt may comprise an aluminum mono-stearate, an aluminum di-stearate, an aluminum tri-stearate, or a combination thereof.

The amount of at least one antistatic agent relative to inorganic oxide supported chromium catalyst in the catalyst composition may be between 0.01% by weight and 10% by weight, or between 0.01% by weight and 5% by weight or between 0.01% by weight and 3% by weight or between 0.01% by weight and 1% by weight based on the total weight of the catalyst composition.

Another advantage of the herein disclosed catalyst compositions is that the bulk density of the catalyst compositions may be higher relative to catalyst compositions prepared from inorganic oxide supported chromium catalysts and a reducing agent in the absence of a modifier, as hereinbefore disclosed. This may facilitate the preparation of larger catalysts batches using existing equipment or the transport of larger catalyst volumes using existing transport containers.

It has also been observed that the bulk density of an inorganic oxide supported chromium catalyst in the absence of reducing agent, that is prior to reduction, may be increased through treatment with a modifier, as hereinbefore disclosed.

Also, the bulk density of an inorganic oxide support, particularly a dehydrated inorganic oxide support, may be increased through treatment with a modifier, as hereinbefore disclosed. The inorganic oxide may be a silica, particularly a dehydrated silica. The bulk density of a dehydrated silica may be increased through addition of a particulate material having an average particle size of less than about 5 micron. The particulate material may be in accordance with any of the embodiments as herein disclosed. The particulate material may be a hydrophobic fumed silica. The particulate material may be a fumed silica that has been treated with a silane.

Further, the bulk density of a reduced inorganic oxide supported chromium catalyst may also be increased through treatment with a modifier, as hereinbefore disclosed.

It will be appreciated that the modifiers, as disclosed herein, may be advantageously employed at various stages of catalyst preparation so as to increase the bulk density of the solid phase.

Reducing Agents

Reducing agents used may be organoaluminum compounds such as aluminum alkyls and alkyl aluminum alkoxides. Alkyl aluminum alkoxides, of the general formula $R_2AlOR$, may be suitable for use in embodiments of this disclosure. The R or alkyl groups of the above general formula may be the same or different, may have from about 1 to about 12 carbon atoms, or about 1 to about 10 carbon atoms, or about 2 to about 8 carbon atoms, or about 2 to about 4 carbon atoms. Examples of the alkyl aluminum alkoxides include, but are not limited to, diethyl aluminum methoxide, diethyl aluminum ethoxide, diethyl aluminum propoxide, diethyl aluminum iso-propoxide, diethyl aluminum tert-butoxide, dimethyl aluminum ethoxide, di-isopropyl aluminum ethoxide, di-isobutyl aluminum ethoxide, methyl ethyl aluminum ethoxide and mixtures thereof. Although the examples use diethyl aluminum ethoxide (DEAlE), it should be understood that the disclosure is not so limited. In the examples that follow, where DEAlE is used, other aluminum alkyls (e.g., trialkylaluminum, triethylaluminum or TEAL, etc.) or alkyl aluminum alkoxides, or mixtures thereof may be used.

Liquid Vehicles

The liquid vehicle may be an inert liquid hydrocarbon and may include isobutane, isopentane, hexane, cyclohexane, heptane, octane, benzene, toluene, and mixtures and isomers thereof.

The chromium-based catalyst composition may comprise:
a) at least one inorganic oxide supported chromium catalyst;
b) a silane treated fumed silica;
c) diethylaluminum ethoxide; and
d) optionally, one or more liquid vehicles.

The chromium-based catalyst composition may comprise:
a) at least one inorganic oxide supported chromium catalyst;
b) a particulate metal carboxylate having an average particle size of less than 20 micron;
c) diethylaluminum ethoxide; and
d) optionally, one or more liquid vehicles.

The chromium-based catalyst composition may comprise:
a) at least one inorganic oxide supported chromium catalyst;

b) a modifier comprising at least one particulate material having an average particle size of less than about 5 micron and/or at least one particulate antistatic agent having an average particle size of less than 20 micron;
c) diethylaluminum ethoxide; and
d) optionally, one or more liquid vehicles.

Methods of Preparing the Chromium-Based Catalyst Compositions

The chromium-based catalyst compositions may be prepared by combining one or more inorganic oxide supported chromium catalysts with at least one particulate material having an average particle size of less than about 5 micron as hereinbefore disclosed and/or one or more antistatic agents as hereinbefore disclosed with one or more reducing agents.

The method may comprise the steps of a) combining one or more inorganic oxide supported chromium catalysts with at least one particulate material having an average particle size of less than about 5 micron and/or one or more antistatic agents in a liquid vehicle and b) adding one or more reducing agents.

The method may also comprise the steps of a) combining one or more inorganic oxide supported chromium catalysts with one or more reducing agents in a liquid vehicle and b) adding at least one particulate material having an average particle size of less than about 5 micron and/or one or more antistatic agents.

The methods may also comprise the step of removing the liquid vehicle so as to provide a substantially dry catalyst composition. The catalyst composition may be in the form of a free flowing powder which may be fed to a polymerization system as is or slurried in a suitable liquid prior to feeding.

The inorganic oxide supported chromium catalyst may be a dry catalyst or a mixture of the catalyst and an inert solvent or mineral oil, and so forth. The inert solvent may be an alkane such as isopentane, hexane, and the like.

The reducing agent may be added to a mixture of a supported silyl chromate catalyst and one or more modifiers are herein disclosed with a non-polar solvent in a catalyst mix vessel or other catalyst preparation vessel. The reducing agent may be added to a mixture of an activated chromium oxide catalyst and one or more modifiers are herein disclosed with a non-polar solvent in a catalyst mix vessel. The reducing agent may be added to a mixture of silyl chromate catalysts and activated chromium oxide-based catalyst and one or more modifiers are herein disclosed in a non-polar solvent in a catalyst mix vessel. When both chromium oxide-based catalysts and silyl chromate-based catalysts are employed together in this disclosure, each catalyst is typically deposited on a separate support and receives different calcination or activation treatments prior to mixing together. The reducing agent may include an organoaluminum compound, an aluminum alkyl, an alkyl aluminum alkoxide such as diethylaluminum ethoxide (DEAlE), a trialkylaluminum such as triethylaluminum (TEAL), a mixture of DEAlE and TEAL, and other organoaluminum compounds, and so forth.

The addition of the reducing agent to the catalyst slurry may be conducted at elevated temperatures and under an inert atmosphere, such as up to 7 bar (100 psig) nitrogen head pressure. For example, the slurry may be maintained at a temperature between about 30° C. and 80° C. during admixture of the reducing agent. The slurry may be maintained at a temperature between about 40° C. and about 60° C. The slurry may be maintained at a temperature between about 40° C. and about 50° C., such as about 45° C.

The reducing agent may be added over time period ranges of 5 seconds to 120 minutes, 1 to 5 minutes, 5 to 15 minutes, 10 to 110 minutes, 30 to 100 minutes, and so forth. For example, where the catalyst composition includes a silyl chromate, the reducing agent may be added over a time period ranging from about 30 seconds to about 10 minutes. After the addition of the reducing agent, the reducing agent may be allowed to react with the catalyst slurry for a specified reaction time. In some embodiments, the reducing agent may be allowed to react with the catalyst slurry for a reaction time in the ranges of from about 5 minutes to about 240 minutes, or about 30 minutes to about 180 minutes, and so on.

In some exemplary embodiments, the chromium-based catalyst may be a silica-supported chromium oxide catalyst. This silica-supported chromium oxide may be prepared from chromic acetate on silica precursors, commercially available under trade names such as Sylopol 957HS, from W.R. Grace and Company, and C35100MS, or C35300MS, from PQ Corporation. The chromic acetate on silica precursors may be heated to temperatures of about 600° C. for about six hours under oxidizing conditions to produce a chromium oxide catalyst. The temperature ramp rates during heating may be specified, for example, in the range of 40 to 120° C. per hour, and several holds at specified temperatures may be conducted for purposes such as allowing moisture and other surface species to be released and purged from the vessel to enhance higher conversion of $Cr^{+3}$ to $Cr^{+6}$. In examples, the fluidization gas is often nitrogen initially, until the end of a hold at a temperature from 300 to 500° C. in which some of the organic fragments are decomposed. Then a switch to air as fluidizing gas may occur in which remaining organics are combusted and a temperature exotherm occurs. In embodiments, after the oxidation step, the activated chromium oxide catalyst is cooled and transferred to an agitated catalyst mix vessel. An amount of non-polar hydrocarbon solvent, such as isopentane, may be added to form a slurry in which the solids are sufficiently suspended.

A selected amount of modifier comprising at least one particulate material having an average particle size of less than about 5 micron and/or at least one antistatic agent may then be added to the chromium oxide catalyst over an addition time period in the range of about 1 second to about 500 minutes.

A selected amount of reducing agent such as DEAlE may then be added to the chromium oxide catalyst and modifier over an addition time period in the range of about 30 seconds to about 500 minutes, while agitating the resultant mixture at an agitation rate in the range of about 15 rpm to about 200 rpm. In other embodiments, the selected time period may be within the range from about 30 minutes to about 240 minutes; from about 60 minutes to about 180 minutes in other embodiments; and from about 90 to about 120 minutes in yet other embodiments. In some embodiments, a selected amount of aluminium alkyl may be added to the chromium oxide catalyst over a time period in the range of about 40 to about 80 minutes, while agitating the resultant mixture at an agitation rate of 30-40 rpm. The mixture may then be allowed to react for a reaction time in the range of from about 30 minutes to about 180 minutes.

In other embodiments, the chromium-based catalyst may be a silica-supported silyl chromate catalyst. This silica-supported silyl chromate catalyst may be prepared from a silica support calcined at temperatures of about 600° C. for a time period in the range of from about one hour to about four hours and subsequently allowed to react with bis (triphenylsilyl)chromate, for example, in a slurry in non-polar hydrocarbon solvent such as isopentane. A selected amount of modifier comprising at least one particulate material having an average particle size of less than about 5 micron and/or at least one antistatic agent may then be added to the slurry of silyl chromate catalyst over an addition time period in the range of about 30 seconds to about 500 minutes.

A selected amount of aluminium alkyl such as DEAlE may then be added to the slurry of silyl chromate catalyst and modifier over an addition time period in the range of about 0.5 to about 10 minutes, while agitating the resultant mixture at an agitation rate in the range of about 15 rpm to about 50 rpm. In a particular embodiment, a selected amount of DEAlE may be added to the silyl chromate catalyst and modifier over a time period in the range of about 1 to about 3 minutes, while agitating the resultant mixture at an agitation rate in the range of 30-40 rpm. The mixture may then be allowed to react for a reaction time in the range of from about 30 minutes to about 180 minutes.

In various embodiments, the selected agitation rate may be less than 70 rpm and the selected reducing agent addition time may be less than 20 minutes. In other embodiments, the selected agitation rate may be greater than 70 rpm and the selected reducing agent addition time may be less than 20 minutes. In yet other embodiments, the selected agitation rate may be greater than 70 rpm and the selected reducing agent addition time may be greater than 20 minutes.

After addition of the reducing agent followed by a suitable period of time to allow for reaction, such as 0 to 2 hours, the catalyst slurry is heated further to remove the non-polar solvent. The drying may result in the slurry transitioning from a viscous slurry to a partially dried slurry or mud to a free-flowing powder. Accordingly, helical ribbon agitators may be used in vertical cylindrical mix vessels to accommodate the varying mixture viscosities and agitation requirements. The agitators may have single or double helical ribbons and may optionally include a central shaft auger or other more complex secondary agitator. Drying may be conducted at pressures above, below, or at normal atmospheric pressure as long as contaminants such as oxygen are generally strictly excluded. Exemplary drying temperatures may range from 0° C. to as much as 100° C., from about 40° C. to about 85° C., from about 50° C. to about 75° C., from about 55° C. to about 65° C., and the like. Exemplary drying times may range from about 1 to about 48 hours, from about 3 to about 26 hours, from about 5 to about 20 hours, and so forth. Following the drying process, the catalyst may be stored under an inert atmosphere until use.

As described above, the addition of a modifier as disclosed herein may improve the flow index consistency of chromium-based catalysts. For a given chromium-based catalyst, the supported chromium solid may be slurried, contacted with a selected quantity of a modifier and reducing agent both fed at a selected feed rates over a selected time period at a selected agitation rate, resulting in a desired reducing agent to chromium ratio or in a desired aluminium loading on the catalyst. The solvent used to slurry the catalyst may then be removed, such as by drying at an adjustable drying temperature, to give a dry, free-flowing catalyst composition. The chromium-based catalyst has a consistent flow index response for making polymer with desired polymer attributes. This catalyst composition may then be fed to a polymerization reactor as is or slurried in a suitable liquid prior to feeding to a polymerization reactor.

Although the general procedure outlined above may apply to chromium catalysts in general, the procedure may be altered according to the particular type of chromium-based catalyst being used. For example, the above procedure may be manipulated for silyl chromate-based catalysts and for chromium oxide-based catalysts, the latter typically requiring an activating step or an oxidizing step to generate the desired Cr+6 species prior to reduction. Additionally, the process may be adjusted depending upon whether the entire catalyst preparation is conducted, or whether a supported chromium compound is purchased and treated according to embodiments described herein.

Chromium-based catalysts formed by the above described processes may have a chromium loading on the support ranging from about 0.15 to about 3 weight percent in some embodiments; from about 0.2 to about 0.3 weight percent in other embodiments; from about 0.4 to about 0.6 weight percent in other embodiments; and from 0.7 to about 1.2 weight percent in other embodiments. Chromium-based catalysts formed by the above described processes may have a reducing agent to chromium molar ratio ranging from about 0.5 to about 8 in some embodiments; from about 2 to about 7 in other embodiments; and from about 3.0 to about 5.5 in yet other embodiments.

The reducing agent may generally be an organoaluminum compound and may be neat or diluted in a non-polar solvent. As discussed above, a variety of reducing agents and inert solvents may be employed. In a particular example, the reducing agent is DEAlE, and may be diluted in a suitable solvent such as 25 weight percent DEAlE in isopentane. Of course, the DEAlE may be diluted at other concentrations and in other solvents.

In one example, the reaction or reduction reaction is conducted at a temperature at about 45° C., or at within 2° C. of about 45° C., and at a pressure of about 30 pounds per square inch gauge (psig). Other temperatures and pressures are applicable.

In certain embodiments, the length of time of adding the reducing agent may be as long as 40 minutes and greater.

Indeed, after the reaction of the reducing agent with the catalyst (in one example, at a reaction temperature of 45° C.), the catalyst drying temperature (e.g., 55° C., 60° C., 65° C., 70° C., 75° C., 80° C., 85° C., etc.) or drying line-out temperature may be adjusted.

The catalyst/modifier mixture and the reducing agent generally react during the addition of the reducing agent. Further, the catalyst/modifier mixture and reducing agent may be given more residence time (i.e., a hold time) to react after the addition of the reducing agent is complete. In certain embodiments, the hold time may be 0.5 hr, 1 hr, 1.5 hrs, 2 hrs, 2.5 hrs, 3 hrs, and so on.

The reaction pressure may be maintained (e.g., via an inert gas or vapor head pressure) at exemplary values of 15 psig, 30 psig, 50 psig, 75 psig, 100 psig, and the like. The reaction temperature may be maintained at exemplary values of 20° C., 25° C., 30° C., 35° C., 40° C., 45° C., 50° C., 55° C., 60° C., and so on. Also, the desired or adjusted drying temperature value (e.g., 60° C., 65° C., 70° C., 75° C., 80° C., etc.) may be varied.

Dispersion of the reducing agent into the reaction mixture may be inhibited. Such lack of dispersion may be more pronounced with aggregation of particles induced by the reducing agent giving a viscous slurry approaching gel-like behaviour. This phenomenon may inhibit good dispersion of the reducing agent throughout the slurry. This problem may be reduced or eliminated through the addition of modifiers as herein disclosed.

Examples of chromium-based catalysts that may benefit from the modifiers as disclosed herein include at least chromium oxide on silica supports, such as high temperature-activated forms of: PQ Corporation C35300MS, C35300MSF (having milling of larger support particles), C36300MS, and ES370; Grace Sylopol 957HS; KD Corporation KDC11C31 and KDC120120; and AGC Sci-Tech Company D-70-120A(LV) silica with chromium, and other catalysts. Of course, other catalyst grades and types are relevant and applicable. Also, additional improvements may be implemented to reduce particle aggregation or agglomeration in the mixture and thus increase dispersion of the reducing agent in the mixture and, therefore, increase homogeneous contact and reaction of the reducing agent with the catalyst. For example, additional improvements may include through modifying the addition rate and method of addition of reducing agent, such as adding reducing agent through a nozzle fitted with an insert tube that extends down below the underside of the top head of the vessel.

Compositions Having Increased Bulk Density

The present disclosure also provides a composition comprising:
a) a thermally treated particulate material;
b) a hydrophobic particulate material; and
c) optionally one or more liquid vehicles.

The thermally treated particulate material may comprise an inorganic oxide such as silica or alumina.

The thermally treated particulate material may be treated at a temperature from between about 150° C. to about 1000° C.

The thermally treated particulate material may have an average particle size from between about 20 microns to about 300 microns.

The thermally treated particulate material further may comprise one or more transition metal compounds.

The transition metal compound may comprise one or more of chromium, titanium, zirconium and hafnium compounds. The thermally treated particulate material may be an activated supported chromium catalyst.

The thermally treated particulate material may further comprise one or more aluminum alkyl species.

The hydrophobic particulate material may have an average particle size from between about 1 nm to about 3 microns or from between about 1 nm to about 500 nm.

The hydrophobic particulate material may be a treated fumed or pyrogenic silica.

The fumed or pyrogenic silica may be treated with a silane to fully or partially reduce surface hydroxyl functionality.

The hydrophobic particulate material may be present in an amount of between about 0.05 and 5% by weight relative to the total weight of the particulate materials or between 0.1 and 3% by weight relative to the total weight of the particulate materials. The liquid vehicle may be as hereinbefore disclosed.

The bulk density of the solid phase of the composition may be increased relative to the bulk density of the solid phase of the composition in the absence of the hydrophobic particulate material.

The bulk density of the solid phase of the composition may be increased by at least 5%, or at least 10%, or at least 15%, or at least 20%, relative to the bulk density of the solid phase of the composition in the absence of the hydrophobic particulate material.

There is also provided a method of increasing the bulk density of a thermally treated particulate material comprising combining a thermally treated particulate material with a hydrophobic particulate material optionally in the presence of one or more liquid vehicles.

Polymerization Processes

Catalysts formed by the above described processes, as well as the catalyst prepared inline discussed below, may be used in the polymerization of olefins by suspension, solution, slurry, and gas phase processes, using known equipment and reaction conditions, and are not limited to any specific type of polymerization system. Generally, olefin polymerization temperatures may range from about 0 to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40 to about 300° C.

Liquid phase polymerization systems such as those described in U.S. Pat. No. 3,324,095, may be used. Liquid phase polymerization systems generally comprise a reactor to which olefin monomers and catalyst compositions are added. The reactor contains a liquid reaction medium which may dissolve or suspend the polyolefin product. This liquid reaction medium may comprise an inert liquid hydrocarbon which is non-reactive under the polymerization conditions employed, the bulk liquid monomer, or a mixture thereof. Although such an inert liquid hydrocarbon may not function as a solvent for the catalyst composition or the polymer obtained by the process, it usually serves as solvent for the monomers used in the polymerization. Inert liquid hydrocarbons suitable for this purpose may include isobutane, isopentane, hexane, cyclohexane, heptane, octane, benzene, toluene, and mixtures and isomers thereof. Reactive contact between the olefin monomer and the catalyst composition may be maintained by constant stirring or agitation. The liquid reaction medium which contains the olefin polymer product and unreacted olefin monomer is withdrawn from the reactor continuously. The olefin polymer product is separated, and the unreacted olefin monomer and liquid reaction medium are typically recycled and fed back into the reactor.

Some embodiments of this disclosure may be especially useful with gas phase polymerization systems, at superatmospheric pressures in the range from 0.07 to 68.9 bar (1 to 1000 psig), from 3.45 to 27.6 bar (50 to 400 psig) in some embodiments, from 6.89 to 24.1 bar (100 to 350 psig) in other embodiments, and temperatures in the range from 30 to 130° C., or from 65 to 110° C., from 75 to 120° C. in other embodiments, or from 80 to 120° C. in other embodiments. In some embodiments, operating temperatures may be less than 112° C. Stirred or fluidized bed gas phase polymerization systems may be of use in embodiments of this disclosure.

Generally, a conventional gas phase, fluidized bed process is conducted by passing a stream containing one or more olefin monomers continuously through a fluidized bed reactor under reaction conditions and in the presence of a catalyst composition at a velocity sufficient to maintain a bed of solid particles in a suspended state. A stream containing unreacted monomer is continuously withdrawn from the reactor, compressed, cooled, optionally partially or fully condensed, and recycled back to the reactor. Product is withdrawn from the reactor and replacement monomer is added to the recycle stream. Gases inert to the catalyst composition and reactants may also be present in the gas stream. The polymerization system may include a single reactor or two or more reactors in series.

Feed streams may include olefin monomer, non-olefinic gas such as nitrogen and hydrogen, and may further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof. The feeds may enter the reactor at a single or multiple and different locations.

Further, the polymerization process is typically conducted substantially in the absence of catalyst poisons such as moisture, oxygen, carbon monoxide and acetylene. However, oxygen can be added back to the reactor at very low concentrations to alter the polymer structure and its product performance characteristics. Oxygen may be added at a concentration relative to the ethylene feed rate to the reactor of about 10 to 600 ppbv, and more preferably about 10 to 500 ppbv. Organometallic compounds may be employed as scavenging agents to remove catalyst poisons, thereby increasing the catalyst activity, or for other purposes. Examples of organometallic compounds that may be added include metal alkyls, such as aluminum alkyls. Conventional adjuvants may also be used in the process, provided they do not interfere with the mechanism of the catalyst composition in forming the desired polyolefin. In some embodiments, hydrogen gas may be added. The use of hydrogen affects the polymer molecular weight and distribution, and ultimately influences the polymer properties. For the purpose of polymerization with chromium-based catalysts of the current invention, the gas mole ratio of hydrogen to ethylene in the reactor may be in the range of about 0 to 0.5, in the range of 0.01 to 0.4 and in the range of 0.03 to 0.3.

An illustrative catalyst reservoir suitable for continuously feeding dry catalyst powder into the reactor is shown and described in U.S. Pat. No. 3,779,712, for example. A gas that is inert to the catalyst, such as nitrogen or argon, is preferably used to carry the catalyst into the bed. In another embodiment the catalyst is provided as a slurry in mineral oil or liquid hydrocarbon or mixture such, as for example, propane, butane, isopentane, hexane, heptane or octane. An illustrative catalyst reservoir is shown and described in WO 2004094489. The catalyst slurry may be delivered to the reactor with a carrier fluid, such as, for example, nitrogen or argon or a liquid, such as, for example, isopentane or other C3 to C8 alkane.

In order to achieve the desired density ranges in the copolymers it is necessary to copolymerize enough of the comonomers with ethylene to achieve a level of about 0 to anywhere from 5 to 10 weight percent of the comonomer in the copolymer. The amount of comonomer needed to achieve this result will depend on the particular comonomer(s) being employed, the catalyst composition, and, particularly, the molar ratio of aluminum to chromium, catalyst preparation conditions, and reactor temperature. The ratio of the comonomer to ethylene is controlled to obtain the desired resin density of copolymer product.

The conditions for polymerizations vary depending upon the monomers, catalysts and equipment availability. The specific conditions are known or readily derivable by those skilled in the art. In some embodiments of this disclosure, polyolefins produced may include those made from olefin monomers such as ethylene and linear or branched higher alpha-olefin monomers containing 3 to about 20 carbon atoms. In other embodiments, homopolymers or interpolymers of ethylene and these higher alpha-olefin monomers, with densities ranging from about 0.905 g/cc to about 0.97 g/cc, may be made; densities ranging from about 0.915 to about 0.965 in other embodiments. Exemplary higher alpha-olefin monomers may include, for example, propylene, 1-butene, 1-pentene, 1-hexene, 4-methyl-1-pentene, 1-octene, and 3,5,5-trimethyl-1-hexene. Exemplary polyolefins may include ethylene-based polymers (at least 50 mole % ethylene), including ethylene-1-butene, ethylene-1-hexene, and ethylene-1-octene copolymers, such as high density polyethylene (HDPE), medium density polyethylene (MDPE) (including ethylene-butene copolymers and ethylene-hexene copolymers), low density polyethylene (LDPE), linear low density polyethylene (LLDPE), or homopolyethylene.

In certain embodiments, polymers of the present disclosure may have flow indices (I21) ranging from about 0.1 g/10 min to about 1000 g/10 min. In other embodiments, polymers of the present disclosure may have flow indices (I21) ranging from about 1 g/10 min to about 300 g/10 min. In yet other embodiments, polymers of the present disclosure may have flow indices (I21) ranging from about 0.5 g/10 min to about 60 g/10 min.

In some exemplary embodiments, the processes and catalysts disclosed herein may be used to produce polyolefins such as ethylene/1-hexene copolymer or ethylene homopolymer under specific reactor conditions. For example, the H2/C2 gas molar ratio may be in the range of from about 0.01 to about 0.5. Oxygen add back may be in the range of from about 10 to about 600 ppbv relative to the ethylene feed rate to the reactor. The reactor operating temperature may be in the range of from about 75 to about 120° C. The reactor may be optionally run in the condensing mode. The conditions for polymerizations vary depending upon the monomers, catalysts and equipment availability. The specific conditions are known or readily derivable by those skilled in the art.

The following test methods should be utilized to obtain the numerical values for certain properties and features as disclosed, e.g. density, productivity, chromium content, or flow indices or melt indices, although it is understood that those values also refer to any results obtained by other testing or measuring methods that might not necessarily be disclosed herein, provided such other testing or measuring methods are published, e.g., in at least one patent, patent application, or scientific publication. Also, it is understood that the values set forth in the claims may have some degree of error associated with their measurement, whether experimental, equipment, or operator error; and that any value in the claim is approximate only, and encompasses values that are plus or minus (+/−) 10% or even 20% from the measured value.

Density values are based on ASTM D1505. Flow Index (I21) values are based on ASTM D1238, run at 190° C., with 21.6 kg weight; the standard designation for that measurement is 190/21.60. Melt Index (I5) values are based on ASTM D1238, run at 190° C., with 5.0 kg weight; the standard designation for that measurement is 190/5. Melt Index (I2) values are based on ASTM D1238, run at 190° C., with 2.16 kg weight; the standard designation for that measurement is 190/2.16.

As described above, the dispersion of a chromium-based supported catalyst can be improved by contacting the chromium-based supported catalyst with a modifier before or after adding a reducing agent. The use of the chromium-based catalyst compositions described herein, wherein the catalysts comprise modifiers as disclosed herein, provides a capacity for polymerization process flexibility, which has significant commercial application in the polymerization of polyolefins.

In addition, embodiments of the present disclosure provide a process for producing chromium-based catalyst compositions with a consistent flow index response. Yet other embodiments provide a process for producing polyolefins comprising forming a chromium-based catalyst composition with a consistent flow index response, as described herein, and contacting the chromium-based catalyst composition with olefins under polymerization conditions.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure.

EXAMPLES

It is to be understood that while the disclosure has been described in conjunction with the specific embodiments thereof, the foregoing description is intended to illustrate and not limit the scope of the disclosure. Other aspects, advantages and modifications will be apparent to those skilled in the art to which the disclosure pertains.

Therefore, the following Examples are put forth so as to provide those skilled in the art with a complete disclosure and description of how to make and use the compositions of the invention, and are not intended to limit the scope of that which the inventors regard as their invention.

Catalyst compositions were prepared by combining 2.5 g of supported chromium catalyst with an amount of solid Cabosil® TS-610 followed by rolling the mixture. 20 ml of n-hexane was then added to slurry the solids. DEALE (approximately 1 ml of a 1.37 M solution) was then added and the resulting mixture shaken for 10-60 minutes. The mixtures were visually examined for particle agglomeration and the heights of the solid catalyst phases were estimated. Table 1 collects the results.

TABLE 1

The effect of Cabosil ® TS-610 on gel formation

| Weight % Cabosil ® TS-610 | Solid height before DEALE addition (Inches) | Solid height after DEALE addition (Inches) | Gel Formation |
|---|---|---|---|
| 0 | 1.53 | 2.20 | Yes (after 5 minutes) |
| 0.5 | 1.63 | 2.00 | Yes (after 15 minutes) |
| 1 | 1.56 | 2.00 | No |
| 2 | 1.50 | 1.50 | No |
| 5 | 1.70 | 1.83 | No |

It can be seen that the addition of Cabosil® TS-610 in an amount of 1% by weight or greater results in prevention of particle aggregation or agglomeration as evidenced by the elimination of gel formation. Further, the bulk density of the catalyst decreases upon the addition of DEALE, as evidenced by the larger volume occupied by the solid catalyst phase, but this may be minimized by the addition of the modifier.

Catalyst compositions were prepared by combining 2.5 g of supported chromium catalyst with an amount of solid aluminum distearate followed by rolling the mixture. 20 ml of n-hexane was then added to slurry the solids. DEALE (1 ml of a 1.37 M solution) was then added and the resulting mixture shaken for 10-60 minutes. The mixtures were visually examined for particle agglomeration and the heights of the solid catalyst phases were estimated. Table 2 collects the results.

TABLE 2

The effect of aluminum distearate on gel formation

| Weight % aluminum distearate | Solid height before DEALE addition (Inches) | Solid height after DEALE addition (Inches) | Gel Formation |
|---|---|---|---|
| 0 | 1.75 | 2.06 | Yes |
| 0.1 | 1.75 | 1.94 | No |
| 0.25 | 1.75 | 1.83 | No |
| 0.5 | 1.75 | 1.75 | No |

It can be seen that the addition of aluminum distearate in an amount of 0.1% by weight or greater results in prevention of particle aggregation or agglomeration as evidenced by the elimination of gel formation. Further, the bulk density of the catalyst decreases upon the addition of DEALE, as evidenced by the larger volume occupied by the solid catalyst phase, but this may be minimized by the addition of the modifier.

Larger scale catalyst compositions were prepared as follows and the results are summarised in Table 3.

A suitable quantity of a porous silica support containing about 5 weight percent chromium acetate (Grade C35300MSF chromium on silica, produced by PQ Corporation), which amounts to about 1 weight percent Cr content, having a particle size of about 82 microns and a surface area of about 500 square meters per gram was charged to a fluidized bed heating vessel. There, the catalyst precursor (chromium on silica) was heated slowly at a rate of about 50° C. per hour under dry nitrogen up to 200° C. and held at that temperature for about 4 hours. Next, the chromium on silica was heated slowly at a rate of about 50° C. per hour under dry nitrogen up to 450° C. and held at that temperature for about 2 hours. The nitrogen stream was then replaced with a stream of dry air and the chromium on silica was heated slowly at a rate of about 50° C. per hour to 600° C. where it was activated for about 6 hours. The activated catalyst was then cooled with dry air (at ambient temperature) to about 300° C. and further cooled from 300° C. to room temperature with dry nitrogen (at ambient temperature). The resulting cooled catalyst powder was stored under nitrogen atmosphere.

In a typical chromium oxide catalyst reduction, the catalyst was placed in a vertical catalyst blender with a double helical ribbon agitator under an inert atmosphere. Dried hexane or isopentane solvent was added to adequately suspend the supported catalyst. All catalysts used C35300MSF. Catalyst batch size was varied, in the comparative example 458 grams of chromium oxide catalyst was added to the mix vessel followed by 2241 grams of hexane. Added to the surface of this mixture with stirring over about a 40 minute period was 142 grams of 25 wt % DEALE in hexane (Akzo Nobel). An insert tube was used during the DEAlE addition to prevent the solution from running down the wall of the mix vessel. The mixture was agitated at 30 RPM at a temperature of approximately 45° C. during the addition time. The mixture was further agitated at a controlled rate for about 1 hour. Then the solvent was substantially removed by drying at a selected jacket temperature for about 16 to 21 hours. The resulting dry, free flowing catalyst powder was then stored under nitrogen until used. For all the inventive examples 538 grams of chromium oxide was used with 2632 grams of hexane. The modifier (Cabosil TS-610 or aluminum distearate) was added before the hexane addition followed by several minutes of stirring before DEALE addition. The 25 wt % DEALE solution (167 grams) was then added over about a 40 minute period and drying conducted in the same way as for the comparative example.

TABLE 3

Pilot scale preparations

| Example | Weight % additive | Modifier | Gel Time (minutes) | Final Catalyst Bulk Density (g/cm$^3$) |
|---|---|---|---|---|
| Inventive | 2.43 | TS-610 | never | |
| Inventive | 1.21 | TS-610 | never | |
| Inventive | 0.70 | TS-610 | never | |
| Inventive | 0.50 | TS-610 | 75 | 0.174 |
| Inventive | 0.25 | TS-610 | 56 | 0.181 |
| Inventive | 0.10 | TS-610 | 51 | 0.169 |
| Inventive | 0.25 | aluminum distearate | never | |
| Inventive | 0.10 | aluminum distearate | 47 | 0.150 |
| Comparative | 0 | none | 20 | 0.155 |

Both modifiers were found to either eliminate or suppress gel formation. At higher levels both modifiers eliminated gel formation during the 100 minute observation period before drying. At low levels (0.1 wt %) both modifiers suppressed the rate of gel formation until after all the DEALE was added at which point gel formation is not an issue since DEALE addition was complete. Bulk density measurements of the final dried catalysts shows that the bulk density of the catalysts made with Cabosil® TS-610 present is considerably higher than that found with the comparative catalyst containing no modifier.

Catalyst compositions prepared according to the methods disclosed herein were tested for ethylene polymerization performance in a continuous gas phase pilot plant and compared to catalyst compositions prepared without modifier. The inventive catalyst compositions performed as well as the comparative catalyst composition in terms of activity and reactor stability.

Further compositions were prepared by adding various amounts of Cabosil® TS-610 to a range of particulate materials. The left hand column of Table 4 indicates the particulate materials examined which include non-dehydrated and dehydrated silicas, and unactivated, activated and reduced supported chromium oxide catalysts. The sample of activated supported chromium oxide catalyst marked with an asterisk in the second column was treated with Cabosil® M-5 in place of Cabosil® TS-610. Cabosil® M-5 is an untreated fumed silica. Each particulate material was slurried in hexane and the amount of Cabosil® indicated in the Table added. After the solid had settled the height of the solid phase was measured. A reduction in the height of the solid is indicative of an increase in the bulk density of the particulate material. The details are collected in Table 4.

TABLE 4

| Particulate Material | Weight % Cabosil TS-610/Cabosil M-5* | Hexane (ml) | Solid height before Cabosil addition (inches) | Solid height after Cabosil addition (inches) |
|---|---|---|---|---|
| DEALE reduced activated supported chromium oxide catalyst | 2.00 | 20 | 1.88 | 1.44 |
| Activated supported chromium oxide catalyst | 1.00 | 20 | 1.83 | 1.50 |
| Activated supported chromium oxide catalyst | 0.50 | 20 | 1.83 | 1.69 |
| Activated supported chromium oxide catalyst | 0.25 | 20 | 1.83 | 1.75 |
| Activated supported chromium oxide catalyst | 1.00* | 20 | 1.83 | 2.00 |
| MS3050 silica non-dehydrated | 1.00 | 20 | 1.56 | 1.56 |
| MS3050 silica dehydrated at 600 C. | 1.00 | 20 | 1.63 | 1.38 |
| Unactivated supported chromium oxide catalyst | 1.00 | 20 | 1.25 | 1.25 |

The addition of Cabosil® TS-610 to dehydrated silica, activated catalyst and reduced catalyst resulted in an increase in the bulk density of the solid phase. Addition of TS-610 to non-dehydrated silica had no effect on the bulk density. Addition of untreated Cabosil® M-5 to activated catalyst had no effect on the bulk density.

What is claimed is:

1. A chromium-based catalyst composition for olefin polymerization, comprising:
   (a) at least one inorganic oxide supported chromium catalyst;
   (b) at least one particulate material having an average particle size of less than about 5 micron and at least one antistatic agent;
   (c) one or more reducing agents; and
   (d) optionally, one or more liquid vehicles.

2. The catalyst composition according to claim 1 wherein the particulate material is at least one treated inorganic oxide.

3. The catalyst composition according to claim 1 wherein the average particle size of the particulate material is less than 3 microns.

4. The catalyst composition according to claim 1 wherein the average particle size of the particulate material is less than 1 micron.

5. The catalyst composition according to claim 1 wherein the treated inorganic oxide is a treated silica.

6. The catalyst composition according to claim 1 wherein the inorganic oxide is treated with a reagent so as to reduce surface hydroxyl functionality.

7. The catalyst composition according to claim 6 wherein the reagent to reduce surface hydroxyl functionality is a silane.

8. The catalyst composition according to claim 6 wherein the inorganic oxide is a fumed silica and the reagent is a silane.

9. The catalyst composition according to claim 1 wherein the particulate material is a hydrophobic silica.

10. The catalyst composition according to claim 1 wherein the at least one antistatic agent is in particulate form.

11. The catalyst composition according to claim 10 wherein the antistatic agent has an average particle size of less than 20 micron.

12. The catalyst composition according to claim 1 wherein the antistatic agent is at least one metal carboxylate salt.

13. The catalyst composition according to claim 12 wherein the at least one metal carboxylate salt is represented by the formula:

$$M(Q)_x(OOCR)_y$$

wherein M is a metal from Group 3 to 16 and the Lanthanide and Actinide series, Q is halogen, hydrogen, a hydroxy or hydroxide, alkyl, alkoxy, aryloxy, siloxy, silane or sulfonate group, R is a hydrocarbyl radical having from 1 to 100 carbon atoms, and x is an integer from 0 to 3 and y is an integer from 1 to 4 and the sum of x and y is equal to the valence of the metal.

14. The catalyst composition according to claim 13 wherein the at least one metal carboxylate salt is represented by the formula:

$$(R_1CO_2)_2AlOH$$

wherein $R_1$ is a hydrocarbyl radical containing from 12 to 30 carbon atoms.

15. The catalyst composition according to claim 14, wherein the at least one metal carboxylate salt comprises an aluminum carboxylate.

16. The catalyst composition according to claim 15, wherein the metal carboxylate salt comprises an aluminum mono-stearate, an aluminum di-stearate, an aluminum tri-stearate, or a combination thereof.

17. The catalyst composition according to claim 1 wherein the reducing agent comprises an organoaluminum compound.

18. The catalyst composition according to claim 1, wherein the chromium catalyst comprises a chromium oxide catalyst, and wherein the reducing agent comprises an aluminum alkyl.

19. The catalyst composition according to claim 1 wherein the reducing agent comprises an alkyl aluminum alkoxide.

20. The catalyst composition according to claim 1 wherein the bulk density of the solid phase of the composition is increased relative to the bulk density of the solid phase of the composition in the absence of modifier.

* * * * *